Dec. 30, 1930.   S. W. RUSHMORE   1,786,633
HYDRAULIC BRAKE
Original Filed Aug. 17, 1927
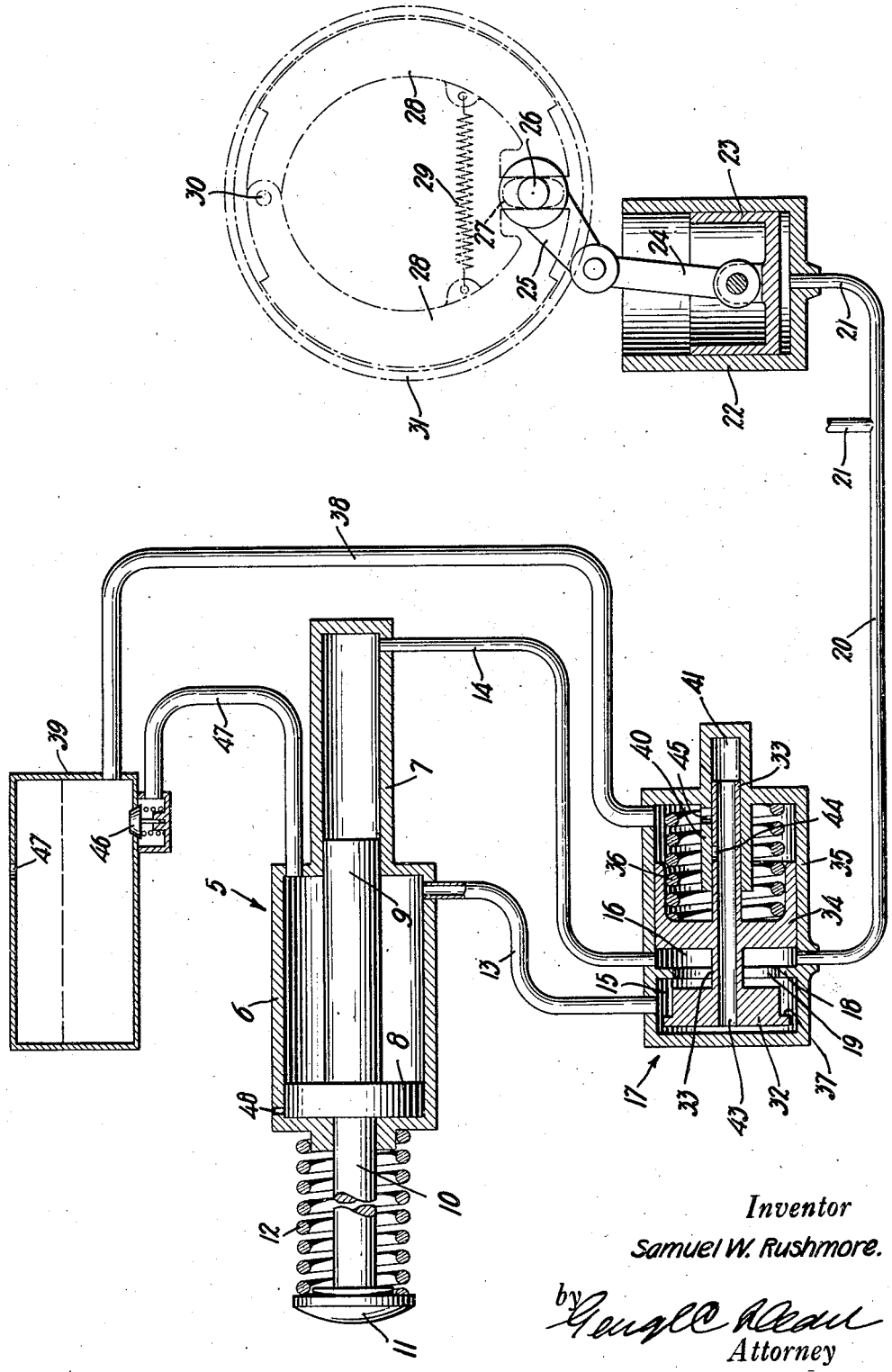
Inventor
Samuel W. Rushmore.
by George C. Dean
Attorney Patented Dec. 30, 1930

1,786,633

UNITED STATES PATENT OFFICE

SAMUEL W. RUSHMORE, OF PLAINFIELD, NEW JERSEY

HYDRAULIC BRAKE

Application filed August 17, 1927, Serial No. 213,490. Renewed September 15, 1930.

My present invention is shown as embodied in hydraulic braking mechanism, particularly adapted for use on vehicles such as automobiles, but it will be evident that certain of its novel features are applicable for other purposes and that the power transmitting medium may be and preferably is a fluid other than water.

In the hydraulic braking systems now commonly used on automobiles, a foot actuated plunger applies the pressure which is transmitted through oil in a conduit, to a motor cylinder that directly actuates the braking mechanism. The practically permissible length of stroke of this foot plunger is short and its diameter is necessarily small as compared with the diameter of the motor cylinder, to give a pressure multiplying ratio great enough for the purpose in view. Consequently, even a full stroke of the relatively small primary cylinder or pressure pump, can supply oil to the relatively large motor cylinder in quantity only sufficient for a relatively short stroke of the latter. Under the most favorable conditions, this is barely sufficient for proper clearance to prevent dragging of the brake shoes during normal running and as a consequence most of the stroke of the foot plunger is used in taking up the clearance and very little is left for applying the brakes. Consequently, the adjustment has to be extremely close and even a little wear or stretching will render the system inoperative.

An object of the present invention is to provide comparatively large capacity, low pressure means to do the light work of bringing the brake shoes to operating position, by a relatively small part of the stroke of the foot plunger and subsequently as the brake shoes come in contact with the brake drums on the wheels, have available a relatively long, high pressure stroke, for the heavy-pressure, small-movement work of actually braking the car.

To this end, I provide a pump which may include a low pressure cylinder and a high pressure cylinder which may be arranged in alignment with each other and operable by a single pedal; the low pressure cylinder being of comparatively large capacity so as to quickly charge the cylinders of the brake operating means and operate them to moderately apply the brakes; the high pressure cylinder being effective to apply the brakes under heavy pressure after the system has been charged by the low pressure cylinders. Provision is also made to automatically cut out the low pressure cylinder and also relieve the low pressure cylinder of back pressure, so that all the pressure applied to the pedal may be used to operate the high pressure piston to apply the brakes.

In one form of the invention, I provide an automatic valve to cut out the low pressure cylinder. Said valve may include two chambers, one connected by means of a duct with the low pressure cylinder and the other connected by a duct with the high pressure cylinder. Within the casing there is provided a piston which is operative through the medium of the liquid from both pump cylinders upon the operation of the pump. The piston has connected therewith a valve head which, when said piston is operated, closes a communicating passage in a diaphragm between said chambers to thus separate the chambers and thus automatically cut out the low pressure cylinder when a predetermined pressure is reached in the system. The high pressure cylinder then becomes effective to apply the brakes under heavy pressure.

To relieve the low pressure piston of back pressure, I have made provision to discharge the liquid from the low pressure cylinder after it has been cut out by closing the cut out valve. To this end, the cylinder of the cut out valve may be provided with a port which is normally closed, the valve head having a hollow stem provided with an aperture which is caused to register with said port when the valve is operated; thus establishing a return passage of the liquid to the reservoir from the low pressure cylinder and through said valve.

Other features and advantages will hereafter appear.

It will be understood that although certain embodiments of the device are shown and described herein, changes in the form, arrangements, proportions, sizes and details thereof may be made without departing from the scope of the invention and that the illustrations are merely diagrammatical.

In the accompanying drawings, which form part of the specification,

The figure is a diagrammatic view illustrating the device embodying the invention including the valve for automatically cutting out the low pressure cylinder.

In the form of the invention illustrated in the figure, a pump 5 includes a low pressure cylinder 6 of comparatively large volume and a high pressure cylinder 7 of comparatively small volume, the cylinders 6 and 7 are arranged in alignment and they are provided with pistons 8 and 9 respectively, said pistons being connected to a piston rod 10 which rod may be operated by a known or desired medium such as is ordinarily employed for operating vehicle brakes, in this case conventionally indicated as the pedal 11. Each piston may normally be at one end of its cylinder and may be pushed inwardly in their respective cylinders by the actuation of the pedal 11, against the action of a return spring 12, to force liquid through ducts 13 and 14 into chambers 15 and 16 of an intermediate device for valve 17, the chambers 16 and 17 having therebetween a valve seat 18 with an opening 19 through which said chambers normally communicate with each other. During the initial part of the stroke of the pedal 11, liquid is forced from the low pressure cylinder and high pressure cylinder into the chambers 15 and 16 and through a duct 20 which may be provided with a plurality of branches 21, each branch connecting with a brake operating cylinder 22 so that the liquid may be forced into said cylinder to move a piston 23 upwardly therein. The piston may be connected through a link 24 to a crank arm 25 to rock a shaft 26 which rock shaft may be provided at its end with a cam 27 to spread internal brake shoes 28 against the action of a spring 29, said brake shoes being swung about a pivot 30 and against the inner surface of a brake drum 31 which may be secured to the wheel of a vehicle or any other rotating element to arrest it.

The principal function of the low pressure cylinder is to quickly charge the system and take up any looseness or slack in the system, including the brakes which may be due to wear; it may also supply pressure for moderate braking. After the system has been charged, the brakes are applied under high pressure by means of the high pressure cylinder 7 as will appear hereinafter more clearly. While the high pressure cylinder is functioning, however, it is desirable to relieve the low pressure cylinder against back pressure. To this end, I have provided the valve 17 which is automatically operated and includes a valve head 32 connected to a stem 33 having thereon a piston 34 in a cylinder 35 of said valve. After the system has become charged and the slack has been taken up, the motor piston 23 offers increasing resistance and the continued pressure on the pedal 13 increases the pressure in the chambers 15 and 18 to move the piston 34 against the action of a return spring 36 thus moving the valve head 32 into the aperture 19 of the diaphragm to close said valve, the valve head being arrested by a flange 37 which contacts with the seat 18. Thus the chamber 15 is shut off from the chamber 16 or, in other words, the low pressure cylinder 6 is cut out of action.

After the low pressure cylinder has been cut out a further action of the high pressure cylinder 7 is effective, through the medium of the liquid in the chamber 16 and the duct 20, to operate the cylinders 21 and apply the brakes 28 under high pressure, the valve head 32 being held in its operated position by the piston 34, which piston is held in its operated position by the pressure of the liquid in the chamber 16.

After the low pressure cylinder 6 has been cut out of action, it is desirable to relieve the back pressure thereon on its piston 8. To this end, there may be provided a return duct 38 which connects the cylinder 35 with a reservoir 39. The cylinder may be provided with a boss 40 having a bore 41 in which the valve stem 33 is guided. Said boss may be provided with a port 42 which is normally closed by said piston rod, the piston rod having a bore 43 extending lengthwise thereof and an aperture 44 extending outwardly therefrom, so that when the piston 34 is operated to close the valve 17 and thus cut out the low pressure cylinder, the aperture 44 registers with the port 42 thus establishing a passage, for the liquid, from the chamber 15 through the bore 43 in the valve stem, aperture 44, port 45, cylinder 35 and duct 38; the latter being connected with the reservoir 39. Thus the superfluous fluid in the low pressure cylinder may be discharged therefrom into the reservoir. The reservoir 39 may be provided with an air vent 47.

Upon the return stroke of the piston 8, after the pressure is removed from the pedal 11, there is a partial vacuum produced in the cylinder 6 and consequently a check valve 46 opens and the liquid flows from the reservoir 39 past said valve through a duct 47 into the low pressure cylinder to refill it.

It will be understood that owing to the large volume of liquid being delivered from the low pressure cylinder 6 upon application of pressure on the pedal 11, the slack will be quickly taken up and increasing load on piston 23 will afford back pressure causing an instant rise in pressure in the valve chamber 15, forcing piston 34, compressing spring 36 and moving valve head 32 through port 19 until the flange 37 is firmly seated against the seat 18 to thus completely seal chamber 15 from chamber 16. The area of piston 34 being greater than the opposite face of valve 32, the differential pressure will hold the valve in the closed position. In this position, the pressure in the low pressure cylinder 6 will be released through the automatic cut out 44, 45. Upon such release, the elastic thrust of the foot of the operator causes the pedal to jump forward a short distance and an instant rise in the pressure in the cylinder 7 and valve chamber 16 increases the differential pressure and effectually locks the flange 37 against the seat. Thereafter, all the pressure upon the pedal 11 is effective in producing high pressures for the heavy-duty, small-movement actuation of the pistons 23 in the brake cylinders 22.

It will be understood that the final braking pressures are greatly in excess of the initial pressures required to seat the brakes and compress spring 35. Hence the cut out operates promptly and the braking pressures thereafter applied through chambers 16 are always ample to hold the valve closed and firmly seated against the diaphragm.

In existing braking systems, there is employed a combined reservoir and hand pump, the pump including a screw to screw down a piston to force more oil into the system in order to drive out all air and to follow up wear of the brake shoes to keep the pedal from striking the floor of the automobile, in other words, such system's oil is added manually from time to time as the brakes wear or as the oil leaks out of the system, the oil never returning to the reservoir.

It will be understood that with my invention, the above mentioned adjustment to take up wear of the brake shoes is entirely eliminated since the system is automatically replenished or kept charged; the liquid flowing continually from and to the reservoir.

A breather hole, 48, may be provided in the upper portion of cylinder 6, to permit free in and out breathing of air behind piston 8, as well as expulsion of any oil that may leak by the piston.

I claim:

1. A fluid braking system, including brake operating means, a pump including a low pressure cylinder and a high pressure cylinder, a reservoir from which the fluid is supplied to the pump, a valve, ducts connecting the low pressure and high pressure cylinders with the valve through which the fluid may be supplied to the valve, a duct through which the fluid may be supplied from the valve to the brake operating means, said valve having two chambers, one connected with the duct of the low pressure, the other connected with the duct of the high pressure cylinder, and a valve head operable by said pump when a predetermined pressure is reached to separate the high pressure chamber from the low pressure chamber so that the brake operating means may be under the influence of the high pressure cylinder only, and a duct to return the fluid from the low pressure chamber to the reservoir to relieve the low pressure cylinder, and a valve stem; said valve having a port which is normally closed by said stem, and said stem having an aperture to register with said port when the valve is operated to establish communication of the low pressure cylinder with the reservoir so as to relieve the low pressure cylinder of back pressure subsequent to the closing of the valve and while the high pressure cylinder is acting on the brake operating mechanism.

2. A fluid braking system, including brake operating means, a pump including a low pressure cylinder and a high pressure cylinder, a reservoir from which the fluid is supplied to the pump, a valve, ducts connecting the low pressure and high pressure cylinders with the valve and through which the fluid may be supplied to said valve, a duct through which the fluid may be supplied from the valve to the brake operating means, said valve having two chambers, one connected with the duct of the low pressure cylinder, the other connected with the duct of the high pressure cylinder, and a valve head operable by said pump when a predetermined pressure is reached to cut out the low pressure cylinder and close the high pressure chamber of the valve so that the brake operating means may be under the influence of the high pressure cylinder only, a duct to return the fluid from the low pressure chamber to the reservoir to relieve the low pressure cylinder, a valve stem, said valve having a port which is normally closed by said stem, and said valve stem having an aperture to register with said port when the valve stem is operated to establish communication between the low pressure cylinder and the reservoir through said valve and the duct connecting it with the reservoir so as to relieve the low pressure cylinder of back pressure subsequent to the closing of the valve and while the high pressure cylinder is acting on the brake operating mechanism, the pressure produced in the high pressure cylinder being effective to hold the valve head closed, and means to retract the valve head upon relieving the high pressure, to enable the fluid to return from the brake operating means to the low pressure cylinder to release the brake.

Signed at Plainfield, in the county of Union and State of New Jersey, this 13th day of August, A. D. 1927.

SAMUEL W. RUSHMORE.